Figure 1:
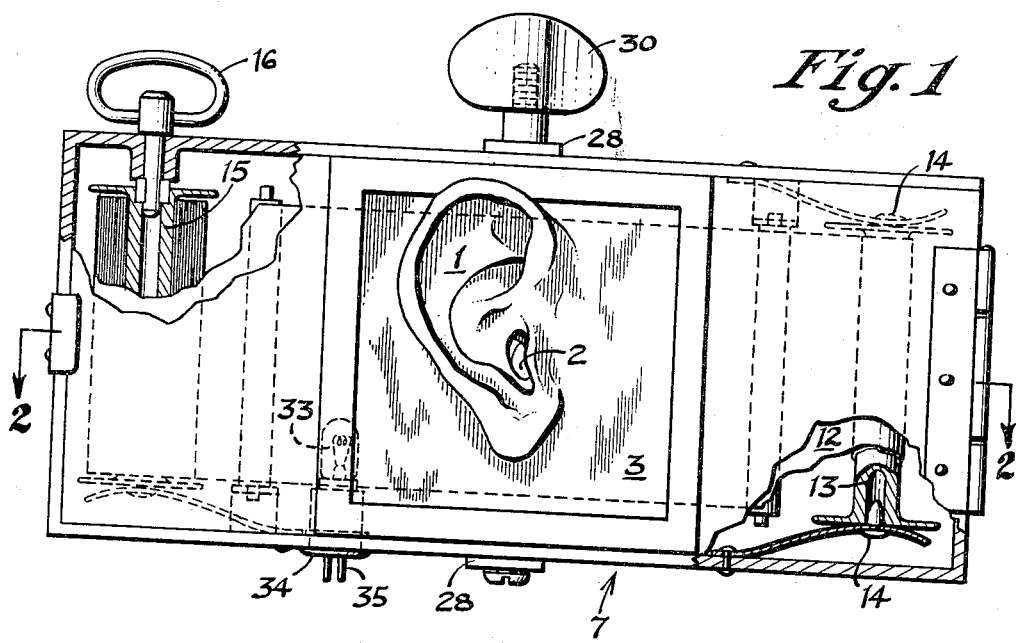

Jan. 22, 1957  I. HANTMAN  2,778,125
TEACHING DEVICE SIMULATING THE HUMAN EAR
Filed Sept. 16, 1955

INVENTOR
IRVIN HANTMAN
BY
ATTORNEY 2,778,125
Patented Jan. 22, 1957

2,778,125
TEACHING DEVICE SIMULATING THE HUMAN EAR

Irvin Hantman, Washington, D. C.

Application September 16, 1955, Serial No. 534,757

5 Claims. (Cl. 35—17)

The present invention relates generally to educational devices, and more particularly to educational devices simulating the human ear, ear canal, ear drumhead and handle of the malleus and including readily and rapidly replaceable drumheads, to facilitate the practice by medical students and others of operative manipulations and procedures under conditions closely simulating those existing in the living human body.

The teaching of methods of examination of the human ear, and the operative and manipulative techniques involved in medically treating the human ear, is particularly difficult because of the curvature, tortuosity and depth of the human ear canal, and the peculiar anatomy of the ear drumhead or tympanic membrane. In accordance with the present invention, I provide an ear manikin, which simulates accurately the various physical features of the interior of the human ear, ear canal and ear drum, including particularly the handle of the malleus and the tympanic membrane, in correct association with each other. The tympanic membrane is provided with a tensioning and pressing device to simulate the actual tension of the corresponding membrane in the living human being, as well as the position of the handle of the malleus on the membrane. Should the membrane be pierced, or otherwise altered or damaged, as in the exercise of the students, means are provided for replacing the latter with a new membrane, by a simple mechanical operation.

The student or the physician may learn, by practice on and manipulation of an ear manikin arranged in accordance with the present invention, to manipulate the ear correctly in order to visualize its internal structure, and to perform actual operations and manipulations, precisely as would be the case were the manikin part of a living person. This practice and experience establishes confidence, and teaches the depth perception, using monocular vision, which is required in viewing the inside of the ear. Each student may repeat manipulations or operative procedures a large number of times, in a relatively short period, renewing the original character of the ear at will and almost instantaneously, when it has been damaged or modified by the manipulation or operative procedure.

It is, accordingly, a broad object of the present invention to provide a simulated ear, having various features of the ear of a living animal, and in which certain structural features which are subject to modification during manipulation of or operation on the ear may be readily replaced.

It is a more specific object of the present invention to provide a simulated human ear including ear, ear canal, handle of malleus and tympanic membrane, in which means are provided for replacing the tympanic membrane at will, in proper physical relation to the other components of the ear, and under suitable tension.

It is still another object of the present invention to provide a simulated human ear, including a continuous sheet of thin flexible material, which simulates physically the tympanic membrane, an enclosure for the sheet which includes, mounted externally of the enclosure, a simulated human ear, ear canal, ear drum head and handle of malleus, a mechanical device for feeding new portions of the sheet at will into proximity with the internal opening of the ear canal, and a device for developing pressure of the simulated membrane itself, and for releasing tension of the simulated membrane when it is to be changed.

Figure 2:
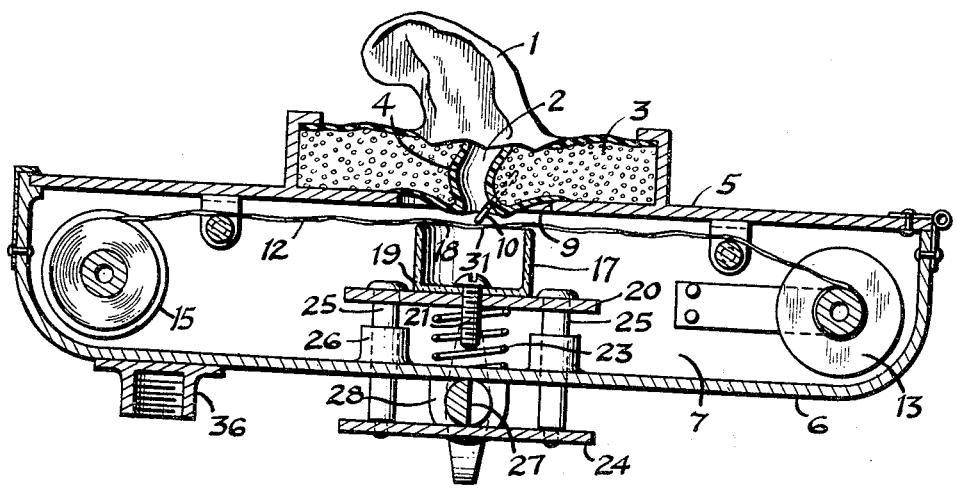
Figure 2:
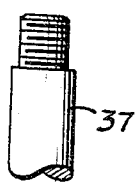

The above and still further features, objects, and advantages of the invention will become apparent upon consideration of the following detailed description of a specific embodiment of the invention, especially when taken in conjunction with the accompanying drawings, wherein:

Figure 1 is a view in front elevation of a device in accordance with the invention; and Figure 2 is a view in section taken on the line 2—2 of Figure 1.

Referring now more particularly to the accompanying drawings, the reference numeral 1 denotes a simulated auricle, or external ear, of a human being. The auricle 1 may be fabricated as a moulage of flexible latex rubber, or other similar material, and may be colored suitably, so that it closely resembles the human ear in texture, size, shape, color and the like. The auricle 1 has the tortuous ear canal 2 secured thereto in proper relation. The artificial auricle 1 is mounted on a block 3 of foam rubber material, or the like soft and resilient material, which may be of the order of ½" thick. An aperture 4 is cut through the block 3 to allow for passage of the ear canal 2 and the artificial auricle 1 and the block 3 are cemented, in superposition, to one wall 5 of a closed box-like enclosure 7, which is provided with a closure. An aperture 9 is provided in the wall 5, to enable communication between the ear canal 2 and the interior of the enclosure 7, the inner end of the ear extending within enclosure 7. Wall 5 can easily be applied or taken off of enclosure 7 to manipulate or inspect its contents.

A thin pin, rod or wire 10 is secured adjacent the internal end of canal 2, extending internally of the closure 7 at a suitable angle to the wall 5 and transversely of the canal 2. The pin, rod, or wire 10 simulates the handle of the malleus, a small bone of the middle ear, being secured so that it points backward, downward and inward in relation to enclosure 7.

The proper direction of the pin 10 is assured by applying acrylic resin in liquid form around the ear canal 2 adjacent the secured end of pin 10, when the pin 10 is mounted, and permitting the resin to solidify or harden while the pin is retained in proper position. Clearly other adherent material which solidifies or hardens on drying may be employed, in place of the acrylic resin. The simulated handle of the malleus may be coated with pink dental wax or flesh colored nail enamel, or some similar material, which gives it the color of the handle of the malleus, in the living ear. While I have described one specific mode of simulating the handle of the malleus, other modes and structures may be employed without departing from the true principles of my invention.

The tympanic membrane, or ear drum, is simulated by a portion of a sheet 12 of thin translucent flexible material, which may be sheet plastic, or may be fabricated of the intestinal walls of sheep. The latter closely simulates in feel, color and texture, the human tympanic membrane.

The sheet 12 is wound as a roll on a reel 13, which extends transversely of the enclosure 7, adjacent one end thereof, and is supported on end-bearing elements 14, which permit the reel 13 to rotate, but provide considerable frictional impedance to rotation. Such bearing elements are commonly employed in box cameras, and the like, which employ roll film. The sheet 12 extends about a second or feed-roll 15, to which one of its ends is secured, and which may be rotated by manual actuation of crank 16, the latter extending externally of the receptacle 7. In passing from reel 13 to reel 15 the sheet 12 passes over the inner terminus of the ear canal 2 at which point it forms and constitutes an ear drumhead. As ear drumheads are pierced, or otherwise used up or destroyed by the students, new drumheads may be brought into position adjacent the inner terminus of the ear canal 2, by rotation of the crank 16, and hence in an extremely short time. Accordingly, many students can participate in an exercise, in quick succession, each being provided with a new, undamaged ear drumhead.

In the actual human ear the handle of the malleus is a part of the tympanic membrane being in a backward, downward and inward direction and the tympanic membrane itself is under a definite tension. To simulate actual conditions in my simulated ear structure, I provide a hollow transparent cup or cylinder 17 fabricated of clear plastic, glass or the like, having a rim 18 in the form of an annulus which may be forced against the sheet 12 which in turn is forced against the inner aspect of wall 5 and forces sheet 12 in contact with the end of the ear canal 2 and the protruding handle of malleus 10 thus simulating the diameter, shape and appearance of the human drumhead. The remaining end 19 of cup or cylinder 17 is closed, and secured to a plate 20, as by a threaded spring aligning rod 21, which extends from the plate 20 toward the closure 6 of enclosure 7. Surrounding the rod 21 is a helical compression spring 23.

The plate 20 is secured to a parallel plate 24, which subsists externally of a closure 7, the plates 20, 24 being joined by a plurality of rods 25, which extend through the closure 6, and which are slidably mounted approximately centrally of rods 25, on a plurality of bosses 26.

A cam 27 is mounted for rotation in a pair of bearings 28, which are suitably secured to the enclosure 7. The plate 24 bears against the cam 27, in response to force exerted by helical compression spring 23, so that in response to rotation of the cam 27, the plate 24, the rods 25, the plate 20 and the cup or cylinder 17 are actuated perpendicularly of the closure 6. The illustration of Figure 2 of the accompanying drawings is of the cup or cylinder 17 in its withdrawn position. On 90° rotation of cam 27, in response to manual actuation of crank 30, the plate 20 is released by the cam 27, and the annular rim 18 of cup or cylinder 17 is constrained to bear against the pad 3, and to secure a portion 31 of sheet 12 thereagainst, whereby that portion of sheet 12 closes off the internal opening of the ear canal 2, and presses against the handle of the malleus 10, with a predetermined pressure, being itself meanwhile under a predetermined tension. This portion 31 of sheet 12 constitutes a simulated ear drumhead. The purpose of the entire tension mechanism is that when a new drumhead is being inserted tension may be withdrawn from against the simulated drumhead while it is being changed. When the new drumhead is in place tension may again be placed against it.

A small electric bulb 33 is located internally of the receptacle 7, so that the light provided thereby illuminates the simulated ear drum, via the transparent cup or cylinder 17. The bulb 33 may be supplied with electric power from externally of the receptacle 7, by means of a fitting 34, having terminals 35.

A female threaded joint 36 may be secured to the receptacle 7, to facilitate mounting of the entire device on a threaded rod 37, which may form part of a universally adjustable tripod or other mount. The student may thus orient the device in any desired position, and retain it in that position while performing aural operative manipulations and procedures, examinations or the like.

While I have described and illustrated one specific example of the present invention it will be clear that variations of the specific details of construction may be resorted to without departing from the true spirit of the invention as defined in the appended claims.

What I claim is:

1. A device for teaching students manipulations and operative procedures relating to the ear, comprising a receptacle having a wall, a simulated ear and ear canal secured to said wall, said ear canal communicating internally of said receptacle, a simulated handle of the malleus secured adjacent said ear canal and extending into said receptacle, an extensive sheet which simulates tympanic membrane extending in proximity to said handle of the malleus, means for pressing a small area of said sheet against said handle of the malleus and for tensioning a further area of said sheet surrounding said small area, and means for replacing said further area and said small area at will by moving said sheet.

2. The combination in accordance with claim 1 wherein said sheet is rolled on a supply reel and moved by rotation of a feed reel, and wherein is provided means extending externally of said container for actuating said feed reel to move said sheet.

3. The combination in accordance with claim 2 wherein is provided an annular element extending parallel to said wall and means for at will pressing said annular element against said sheet and encircling said handle of the malleus or withdrawing said ring from said sheet to enable movement of said sheet, said last means including an actuating member extending externally of said receptacle.

4. The combination in accordance with claim 3 wherein is provided a source of light within said receptacle, and means for energizing said source of light, said last means controllable from externally of said receptacle.

5. A device for teaching students manipulations and operative procedures relating to the ear, comprising a plate having two sides, a simulated ear canal secured to one side of said plate, an aperture in said plate communicating with said ear canal, a simulated handle of the malleus secured adjacent said ear canal and extending through said aperture, an extensive sheet which simulates tympanic membrane extending in proximity to said handle of the malleus, means for pressing at least a small area of said sheet against said handle of the malleus and for tensioning a further area of said sheet surrounding said small area, and means for replacing said further area and said small area at will by moving said sheet.

No references cited.